United States Patent [19]

Moriyama

[11] Patent Number: 5,257,062
[45] Date of Patent: Oct. 26, 1993

[54] FOCUSING DETECTION APPARATUS

[75] Inventor: Keiji Moriyama, Yokohama, Japan

[73] Assignee: Nikon Corporation, Tokyo, Japan

[21] Appl. No.: 941,319

[22] Filed: Sep. 4, 1992

[30] Foreign Application Priority Data

Sep. 10, 1991 [JP] Japan ................... 3-258477

[51] Int. Cl.$^5$ .......................... G03B 13/36; G01J 1/20; G02B 7/28
[52] U.S. Cl. .................... 354/408; 250/201.8
[58] Field of Search ............... 354/402, 406, 407, 408; 250/201.2, 201.7, 201.8

[56] References Cited

U.S. PATENT DOCUMENTS 4,908,504  3/1990  Karasaki et al. ................. 354/408 X
5,109,154  4/1992  Higashihara et al. ........... 354/407 X
5,160,834  11/1992  Moriyama ............................ 354/408

FOREIGN PATENT DOCUMENTS 63-278012  11/1988  Japan .

Primary Examiner—W. B. Perkey
Attorney, Agent, or Firm—Shapiro and Shapiro

[57] ABSTRACT

A focusing detection apparatus has at least a focusing detection area on an optical axis of a photographing lens and a focusing detection area off the optical axis of the photographing lens in a photographing field and has a focusing detection optical system including at least a pair of apertures and a pair of refocusing lenses provided one set for each of the focusing detection areas. The focusing detection optical systems are arranged such that a positional relation between centers of the pair of aperture corresponding to the off-axis focusing detection area and optical axes of the pair of refocusing lenses is different from a positional relation between the centers of the pair of apertures corresponding to the on-axis focusing detection area and the optical axes of the pair of refocusing lenses.

8 Claims, 9 Drawing Sheets

FIG. 12

| RADIUS OF CURVATURE | LENS THICKNESS-SPACE | INDEX OF REFRACTION | ABBE-NUMBER | |
|---|---|---|---|---|
| r1=∞ | d1=3.767 | | | VIEW MASK |
| r2=∞ | d2=0.55 | Nd1=1.51680 | vd1=64.1 | INFRARED BLOCKING FILTER |
| r3=∞ | d3=0.1 | | | |
| r4=+10.0801 | d4=4.3 | Nd2=1.49212 | vd2=57.8 | CONDENSER LENS |
| r5=ASPHERICAL | d5=14.0141 | | | |
| r6=∞ | d6=0.1 | | | IRIS MASK |
| r7=+6.47 | d7=2.1 | Nd3=1.58518 | vd3=30.2 | REFOCUSING LENS |
| r8=-2.6999 | d8=2.5613 | | | |
| r9=∞ | d9=0.5 | Nd4=1.51680 | vd4=64.1 | COVER GLASS |
| r10=∞ | d10=0.65 | | | |

FIG. 13

| RADIUS OF CURVATURE | LENS THICKNESS-SPACE | INDEX OF REFRACTION | ABBE-NUMBER | |
|---|---|---|---|---|
| r7=+6.47 | d7'=2.0894 | Nd3=1.58518 | vd3=30.2 | REFOCUSING LENS |
| r8=-2.6999 | d8=2.5719 | | | |

FOCUSING DETECTION APPARATUS

BACKGROUND OF THE INVENTION

1. Field of the Invention

The present invention relates to a focusing detection apparatus of a phase difference detection type which has a plurality of focusing detection areas in a photographing field.

2. Related Background Art

In a known focusing detection apparatus which permits the detection of focusing of an object without changing a framing of a camera wherever an object to be photographed is in a photographing field, there are provided in the photographing field a focusing detection area including a center of the photographing field, that is, an optical axis of a photographing lens (hereinafter referred to as on-axis focusing detection area) and a focusing detection area which does not include the center of the photographing field, that is, the optical axis of the photographing lens (hereinafter referred to as an off-axis focusing detection area).

Such a focusing detection apparatus comprises a view field mask having apertures for defining positions and sizes of the focusing detection areas and a set of focusing detection optical system for directing focusing detection light beams transmitted through the apertures of the view field mask to a pair of photo-electric converter arrays. Output signals from the pair of photo-electric converter arrays are processed under a predetermined algorithm to detect the focusing state of the photographing lens at each focusing detection area. The set of focusing detection optical system provided for each focusing detection area comprises a condenser lens, a pair of mark apertures and a pair of refocusing lenses.

Where a plurality of focusing detection areas are provided in the photographing field, the focusing detection optical system, particularly the refocusing lenses and the photo-electric converter arrays are of large size in order to avoid interference between the focusing detection light beams.

Further, in the off-axis focusing detection areas arranged on radial lines centered at the center of the photographing field, that is, at the optical axis of the photographing lens, there is a difference between distortions of pairs of secondary images because the corresponding focusing detection optical systems (hereinafter referred to as off-axis focusing detection optical systems) are arranged eccentrically with respect to a pupil of the photographing lens, and this causes the reduction of a focusing detection precision.

In order to solve the above problem, it has been proposed to arrange a deflecting member in a vicinity of the condenser lens of the focusing detection optical system to deflect the focusing detection light beam from the off-axis focusing detection area along the optical axis in order to reduce the size of the photo-electric converter. (See, for example, Japanese Laid-Open Patent Application No. 63-278012). However, since it requires to arrange the deflecting member in the focusing detection optical system, it is not suitable for the size reduction of the focusing detection optical system.

SUMMARY OF THE INVENTION

It is an object of the present invention to provide a focusing detection apparatus which maintains a high detection precision in an off-axis focusing detection area without requiring a special member and can reduce the size of a focusing detection optical system and a photo-electric converter array.

In order to achieve the above object, in accordance with one embodiment shown in FIG. 1, a focusing detection apparatus is provided with a focusing detection optical system for each of focusing detection areas including at least a focusing detection area on an optical axis 0 of a photographing lens and a focusing detection area off the optical axis of the photographing lens in a photographing field. The focusing detection optical system comprises at least a pair of apertures 401 and 402 (411 and 412, and 421 and 422) and a pair of refocusing lenses 501 and 502 (511 and 512, and 521 and 522). A positional relation between centers of the pair of apertures 411 and 412 (421 and 422) of the focusing detection optical system corresponding to the off-axis focusing detection area and optical axes of the pair of refocusing lenses 511 and 512 (521 and 522) is different from that of the focusing detection optical system corresponding to the on-axis focusing detection area.

In another embodiment, the optical axes of the pair of refocusing lenses 511 and 512 (521 and 522) corresponding to the off-axis focusing detection area are arranged symmetrically with respect to a symmetry axis of the pair of apertures 411 and 412 (421 and 422).

In an embodiment shown in FIG. 2, the optical axes of the pair of refocusing lenses 511 and 512 (521 and 522) of the focusing detection optical system corresponding to the off-axis focusing detection area are arranged asymmetrically with respect to the symmetry axis of the pair of apertures 411 and 412 (421 and 422).

In an embodiment shown in FIG. 3, a symmetry axis of spherical lens surfaces 511A and 512A (521A 522A) of the pair of refocusing lenses 511 and 512 (521 and 522), which face the apertures, of the focusing detection optical system corresponding to the off-axis focusing detection area and a symmetry axis of spherical lens surfaces 511B and 512B (521B and 522B) are eccentric.

In general, if a positional relation between a center of an aperture and an optical axis of a lens is eccentric parallelly to a direction normal to the optical axis, a height of incident ray and a height of emergent ray of a light beam to the lens vary. As a result, an aberration status which remains in the light beam and a direction of the light beam emerged from the lens vary.

In the on-axis focusing detection optical system, the residual aberration status is symmetric because a pair of light beams used for the focusing detection are symmetric with respect to the optical axis of the photographing lens. In the off-axis focusing detection optical system, however, the residual aberration status in the pair of light beams used for the focusing detection are different from each other because the optical system is arranged eccentrically to the pupil of the photographing lens. Namely, there occurs a difference in distortions which adversely affects to the focusing detection.

The residual aberration status in the pair of light beams used for the focusing detection can be corrected by making parallel eccentricity (variable eccentricity) in a plane normal to the optical axis of the photographing lens, the positional relation between the centers of the pair of apertures in the off-axis focusing detection optical system and the optical axes of the pair of refocusing lenses corresponding to the apertures such that the positional relation is different from that of the on-axis focusing detection optical system.

Since the direction of the light beam emerged from the lens also varies, the movement of the photo-electric converter arrays (the avoidance of interference between the photo-electric converter arrays or the reduction of the charge transfer path) is attained.

Further, if the off-axis focusing detection area is restricted to a minimum required for the focusing detection, the distortion difference is suppressed to a small valve and a freedom of movement of the photo-electric converter arrays is significantly increased, and the size reduction of a chip is attained.

BRIEF DESCRIPTION OF THE DRAWINGS

FIG. 12 shows lens data in the first embodiment, FIG. 13 shows Y-axis data of the refocusing lens.

DETAILED DESCRIPTION OF THE PREFERRED EMBODIMENTS

Figure 4:
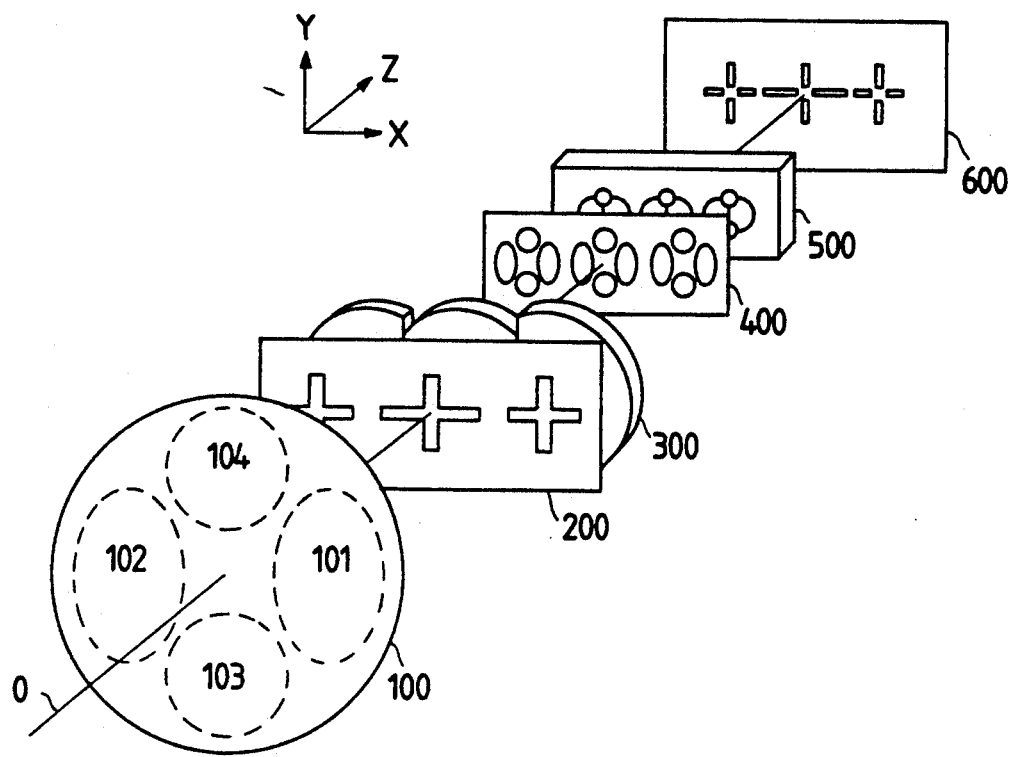
FIG. 4 shows a perspective view of a focusing detection optical system.
Figure 5:
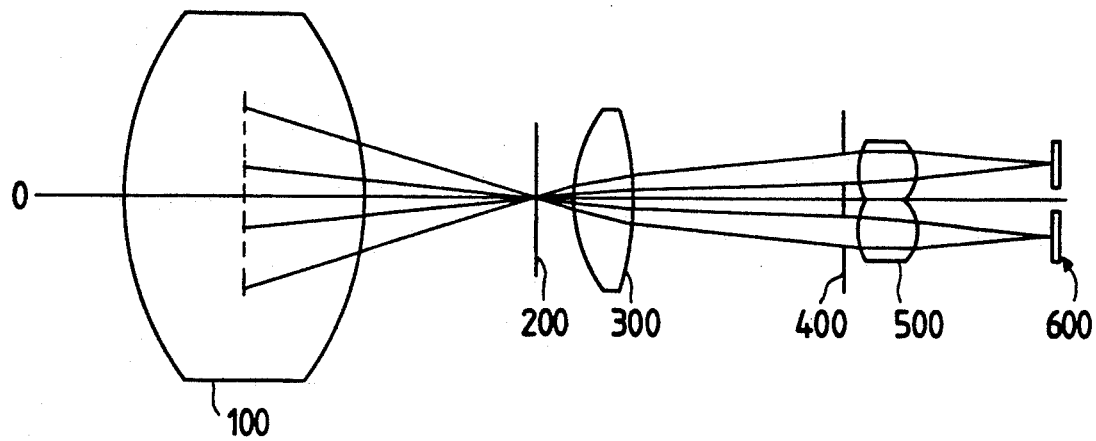
FIG. 5 shows a basic operation of the focusing detection optical system.

FIG. 4 shows a perspective view of a focusing detection optical system of the present invention, and FIG. 5 shows a basic operation of the focusing detection optical system.

Numeral 100 denotes a photographing lens which has pupils 101–104. Numeral 200 denotes a view field mask which is arranged in a vicinity of an anticipated focal plane of the photographing lens 100 equivalent to a film plane and which defines three cross-shaped focusing detection areas in a photographing field. The cross-shaped focusing detection areas have sets of orthogonal sub-areas which are parallel to a major side of the photographing field (X-direction in FIG. 4) and a minor side (Y-direction in FIG. 4), respectively. The cross-shaped focusing detection area at the center of the field is an on-axis focusing detection area having a center thereof on an optical axis (Z-axis in FIG. 4), and the left and right cross-shaped focusing detection areas are off-axis focusing detection areas having centers thereof off the optical axis. Numeral 300 denotes a condenser lens arranged behind the view field mask 200, numeral 400 denotes an aperture mask having a pair of apertures for each focusing detection area, numeral 500 denotes a refocusing lens provided one for each pair of apertures of the aperture mask 400 for refocusing a pair of focusing detection light beams from each focusing detection area to a pair of photo-electric converter array, numeral 600 denotes a photo-electric converter having a pair of photo-electric converter arrays for each focusing detection area, and 0 denotes an optical axis of the photographing lens.

FIRST EMBODIMENT

A first embodiment is explained with reference to FIGS. 4 to 15.

Figure 6:
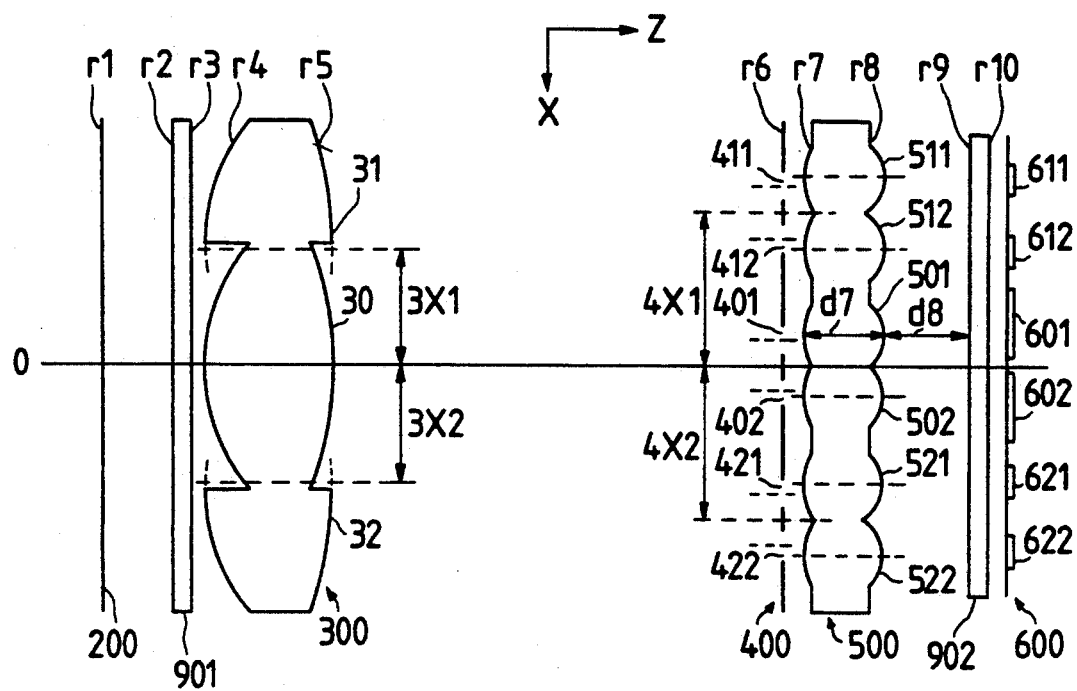
FIG. 6 shows an X-Z sectional view of a focusing detection optical system in the first embodiment.

FIG. 6 shows an X-Z sectional view of a focusing detection optical system in the first embodiment. It shows the focusing detection optical system for the three focusing detection areas along the major side (X-direction) of the photographing field in the three cross-shaped focusing detection areas shown in FIG. 4.

The center on-axis focusing detection optical system comprises a condenser lens 30, apertures 401 and 402 and refocusing lenses 501 and 502, and it directs a pair of light beams from the center on-axis focusing detection area to a pair of photo-electric converter arrays 601 and 602.

The left (as viewed from the incident side of the photographing lens 100) off-axis focusing detection optical system comprises a condenser lens 31, apertures 411 and 412 and refocusing lenses 511 and 512, and it directs a pair of light beams from the left off-axis focusing detection area to a pair of photo-electric converter arrays 611 and 612.

The right off-axis focusing detection optical system comprises a condenser lens 32, apertures 421 and 422 and refocusing lenses 521 and 522, and it directs a pair of light beams from the left off-axis focusing detection area to a pair of photo-electric converter arrays 621 and 622.

Numeral 901 denotes an infrared ray blocking filter inserted between the view field mask 200 and the condenser lens 300, and numeral 902 denotes a cover glass for the photo-electric converter, which is inserted between the refocusing lens 500 and the photo-electric converter 600.

Numerals 3X1 and 3X2 denote deviations of the left and right condenser lenses 31 and 32 from the optical axis 0, and numerals 4X1 and 4X2 denote distances between symmetry axes of the left and right pairs of apertures 411 and 412, and 421 and 422, and the optical axis 0.

Figure 7:
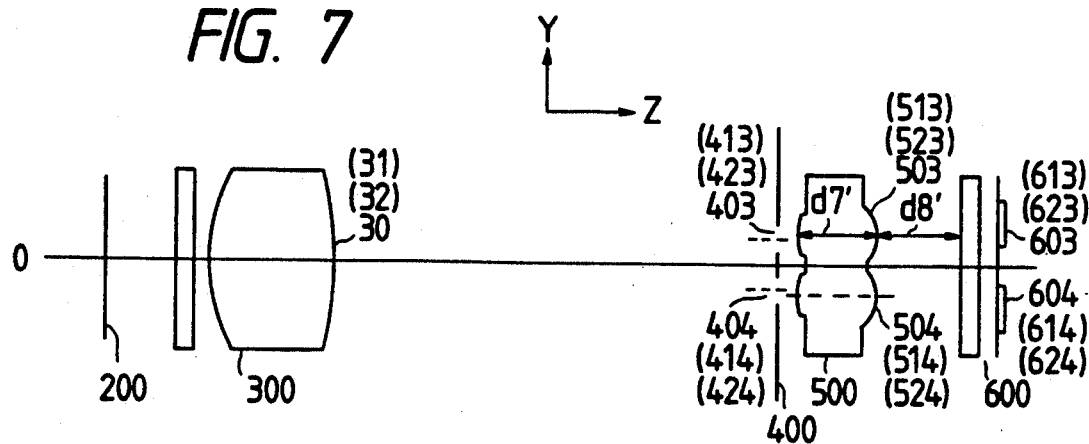
FIG. 7 shows a Y-Z sectional view of the focusing detection optical system in the first embodiment.

FIG. 7 shows a Y-Z sectional view of the focusing detection optical system of the first embodiment. It shows the focusing detection optical system for the three focusing detection areas along the minor side (Y-axis) of the photographing field in the three cross-shaped focusing detection areas shown in FIG. 4. Since those three focusing detection optical systems overlap on the Y-Z plan view, only the center on-axis focusing detection optical system is shown and the left and right off-axis focusing detection optical systems are omitted from the drawings.

The center on-axis focusing detection optical system comprises a condenser lens 30, apertures 403 and 404 and refocusing lenses 503 and 504, and it directs a pair of light beams from the center on-axis focusing detection area to a pair of photo-electric converter arrays 603 and 604.

The left off-axis focusing detection optical system comprises a condenser lens 31, apertures 413 and 414 and refocusing lenses 513 and 514, and it directs a pair of light beams from the left off-axis focusing detection area to a pair of photo-electric converter arrays 613 and 614.

The right off-axis focusing detection optical system comprises a condenser lens 32, apertures 423 and 424 and refocusing lenses 523 and 524, and it directs a pair of light beams from the light off-axis focusing detection area to a pair of photo-electric converter arrays 623 and 624.

In order to reduce the size of the refocusing lenses of the respective optical systems, the thickness d7' of the refocusing lens is different from the thickness d7 of the Y-axis refocusing lens shown in FIG. 6.

Figure 8:
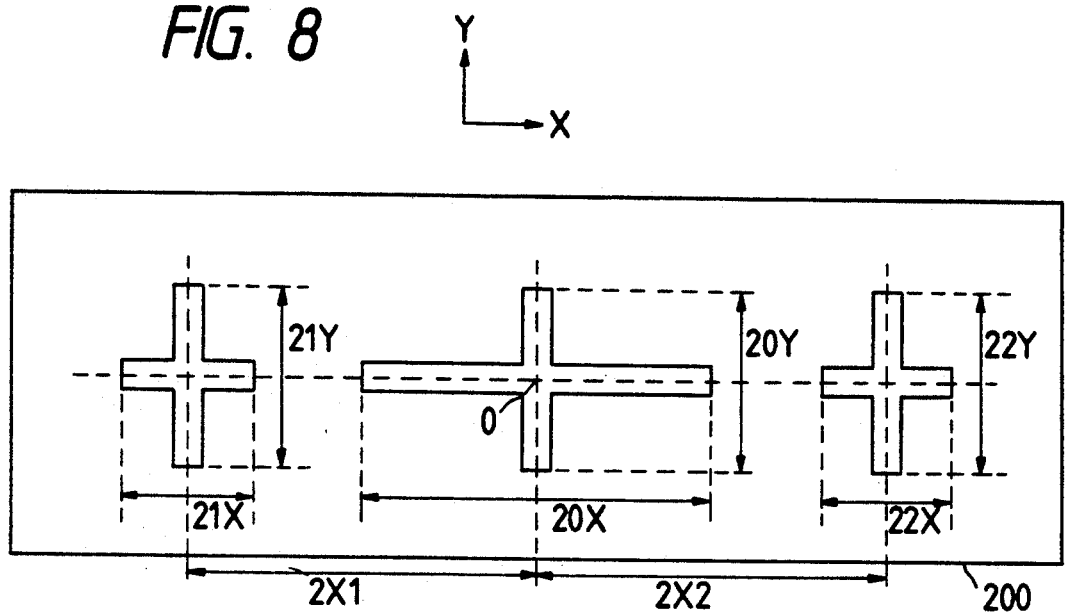
FIG. 8 shows a front view, as viewed from a photographing lens, of a view field mask in the first embodiment.

FIG. 8 shows a front view, as viewed from the photographing lens, of the view field mask in the first embodiment. As described above, the on-axis cross-shaped focusing detection area is set at the center of the photographing field, and the off-axis cross-shaped focusing detection areas are set on the left side and the right side of the field.

An aperture 20X extending along the major side (X-axis) of the field and an aperture 20Y extending along the minor side (Y-axis) are orthogonally set in the center on-axis cross-shaped focusing detection area.

An aperture 21X extending along the major side (X-axis) of the field and an aperture 21Y extending along the minor side (Y-axis) are orthogonally set in the left off-axis cross-shaped focusing detection area.

Further, an aperture 22X extending along the major side (X-direction) of the field and an aperture 22Y extending along the minor side (Y-axis) are orthogonally set in the right off-axis cross-shaped focusing detection area.

Deviations of the centers of the left and right cross-shaped off-axis detection areas from the optical axis are represented by 2X1 and 2X2, respectively.

In the following description, the respective apertures of the view field mask 200 are treated as the focusing detection areas.

Figure 9:
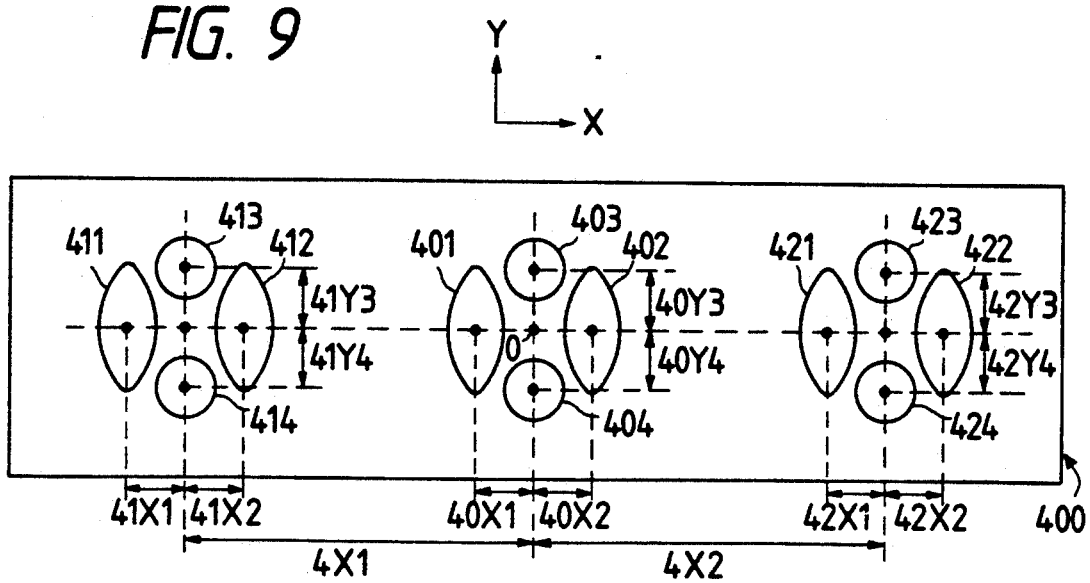
FIG. 9 shows a front view, as viewed from the photographing lens, of the aperture mask in the first embodiment.

FIG. 9 shows a front view, as viewed from the photographing lens, of the aperture mask 400 in the first embodiment.

The apertures 401 and 402 are positioned relative to the center on axis cross-shaped focusing detection areas 20X and 20Y such that the centers of the apertures are at distances 40X1 and 40X2 in the X direction from the optical axis 0, respectively, and the apertures 403 and 404 are positioned such that the centers of the apertures are at distances 40Y3 and 40Y4 in the Y direction from the optical axis 0, respectively.

The apertures 411 and 412 are positioned relative to the left off-axis cross-shaped focusing detection areas 21X and 21Y such that the centers of the apertures are at distances 41X1 and 41X2, respectively, in the X direction from the symmetry axis which is at a distance of 4X1 from the optical axis 0, and the apertures 413 and 414 are positioned such that the centers of the apertures are at distances 41Y3 and 41Y4, respectively, in the Y direction from the symmetry axis.

The apertures 421 and 422 are positioned relative to the right off-axis cross-shaped focusing detection areas 22X and 22Y such that the centers of the apertures are at distances 42X1 and 42X2, respectively, in the X direction from the symmetry axis which is at a distance of 4X2 from the optical axis 0, and the apertures 423 and 424 are positioned such that the centers of the apertures are at distances 42Y3 and 42Y4, respectively, in the Y direction from the symmetry axis.

The distances from the symmetry axis to the centers of the respective apertures are equal. Namely, $$40X1 = 40X2 = 40Y3 = 40Y4 = 41X1 = 41X2 = 41Y3 = 41Y4 = 42X1 = 42X2 = 42Y3 = 42Y4$$

Figure 10:
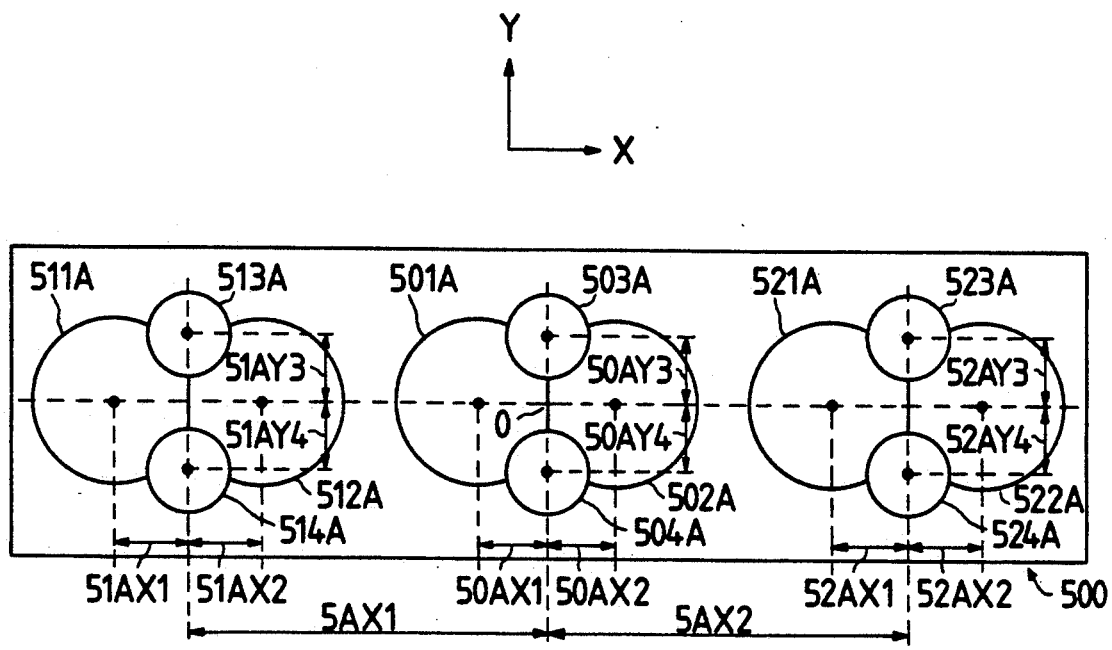
FIG. 10 shows a front view, as viewed from the photographing lens, of the refocusing lens in the first embodiment.

FIG. 10 shows a front view, as viewed from the photographing lens, of the refocusing lens 500 in the first embodiment. The refocusing lenses 501–524 shown in FIGS. 6 and 7 have different shapes and arrangements between the front views and the rear views, as viewed from the photographing lens. In the following description, A is added to the numeral of the refocusing lens to represent the front spherical plane of the refocusing lens, and B is added to the numeral of the refocusing lens to represent the rear spherical plane of the refocusing lens.

With respect to the center on-axis cross-shaped focusing detection areas 20X and 20Y, the refocusing lens spherical planes 501A and 502A are positioned such that the centers of the spherical planes are at distances 50AX1 and 50AX2, respectively, in the X direction from the optical axis 0, and the refocusing lens spherical planes 503A and 504A are positioned such that the centers of the spherical planes are at distances 50AY3 and 50AY4, respectively, in the Y direction from the optical axis 0.

With respect to the left off-axis cross-shaped focusing detection areas 21X and 21Y, the refocusing lens spherical planes 511A and 512A are positioned such that the centers of the spherical planes are at distances 51AX1 and 51AX2, respectively, in the X direction from the symmetry axis which is at a distance of 5AX1 from the optical axis 0, and the refocusing lens spherical planes 513A and 514A are positioned such that the centers of the spherical planes are at distances 51AY3 and 51AY4, respectively, in the Y direction from the symmetry axis.

Further, with respect to the right off-axis cross-shaped focusing detection areas 22X and 22Y, the refocusing lens spherical planes 521A and 522A are positioned such that the centers of the spherical planes are at distances 52AX1 and 52AX2, respectively, in the X direction from the symmetry axis which is at a distance of 5AX2 from the optical axis 0, and the refocusing lens spherical planes 523A and 524A are positioned such that the centers of the spherical planes are at distances 52AY3 and 52AY4, respectively, in the Y direction from the symmetry axis.

Figure 11:
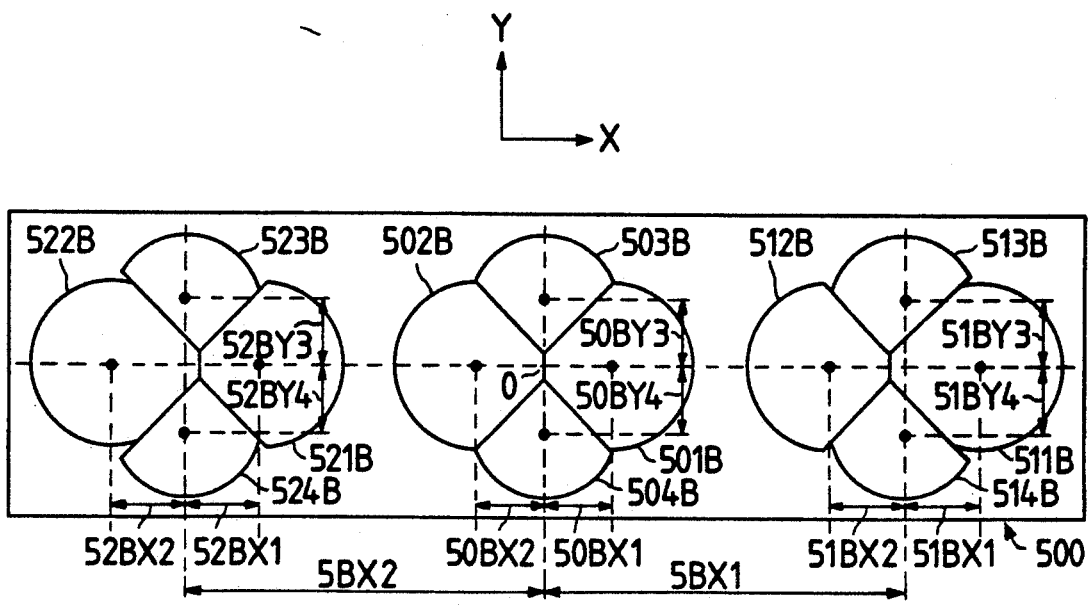
FIG. 11 shows the refocusing lens in the first embodiment, viewed from a photo-electric converter.

FIG. 11 shows a view, as viewed from the photoelectric converter 600 of the refocusing lens 500 of the first embodiment. Accordingly, it is laterally symmetrical to the refocusing lens shown in FIG. 10 with respect to FIG. 10.

For the on-axis cross-shaped focusing detection areas 20X and 20Y at the center of the drawing, the refocusing lens spherical planes 501B and 502B are positioned such that the centers of the spherical planes are at distances 50BX1 and 50BX2, respectively, in the X direction from the optical axis 0, and the refocusing lens spherical planes 503B and 504B are positioned such that the centers of the spherical planes are at distances 50BY3 and 50BY4, respectively, in the Y direction from the optical axis 0.

For the off-axis cross-shaped focusing detection areas 21X and 21Y on the left of the drawing, the refocusing lens spherical planes 511B and 512B are positioned such that the centers of the spherical planes are at distances 51BX1 and 51BX2, respectively, in the X direction from the optical axis 0, and the refocusing lens spherical planes 513B and 514B are positioned such that the centers of the spherical planes are at distances 51BY3 and 51BY4, respectively, in the Y direction from the symmetry axis.

Further, for the off-axis cross-shaped focusing detection areas 22X and 22Y, the refocusing lens spherical planes 521B and 522B are positioned such that the centers of the spherical planes are at distances 52BX1 and 52BX2, respectively, in the X direction from the symmetry axis which is at a distance of 5BX2 from the optical axis 0, and the refocusing lens spherical planes 523B and 524B are positioned such that the centers of the spherical plane are at distances 52BY3 and 52BY4, respectively, in the Y direction from the symmetry axis.

FIG. 12 shows lens data of the first embodiment, and FIG. 13 shows refocusing lens data in the Y direction shown in FIG. 7.

Data of the elements shown in FIGS. 6–11 are shown below.

> Magnification Factor $\beta$ (Image of Photographing lens ~ Secondary Image) = −0.26
> 2X1 = 2X2 = 7, 20X = 7, 21X = 22X = 1.5,
> 20Y = 21Y = 22Y = 3, 3X1 = 3X2 = 3.93,
> 4X1 = 4X2 = 4.55,
> 40X1 = 40X2 = 40Y3 = 40Y4 = 41X1 = 41X2 = 41Y3 = 41Y4 = 42X1 = 42X2 = 42Y3 = 42Y4 = 0.808,
> 50AX1 = 50AX2 = 50AY3 = 50AY4 = 0.9,
> 51AX1 = 51AX2 = 52AX1 = 52AX2 = 0.92,
> 51AY3 = 51AY4 = 52AY3 = 52AY4 = 0.9,
> 50BX1 = 50BX2 = 50BY3 = 50BY4 = 0.9,
> 51BX1 = 51BX2 = 52BX1 = 52BX2 = 0.92,
> 51BY3 = 51BY4 = 52BY3 = 52BY4 = 0.9

An aspherical shape of a radius of curvature $\gamma 5$ follows the following formula (X-Z cross section).

$$\Delta Z = (X^2/Ro)/\{1 + (1 - \kappa X^2/Ro^2)^{\frac{1}{2}}\} + C4X^4 + C6X^6$$

where radius of curvature at the center $Ro = -18.139$, cone curve constant $\kappa = +1.20$, aspherical coefficient $C4 = +0.2992 \times 10^{-3}$ and aspherical coefficient $C6 = +0.1814 \times 10^{-5}$.

Figure 1:
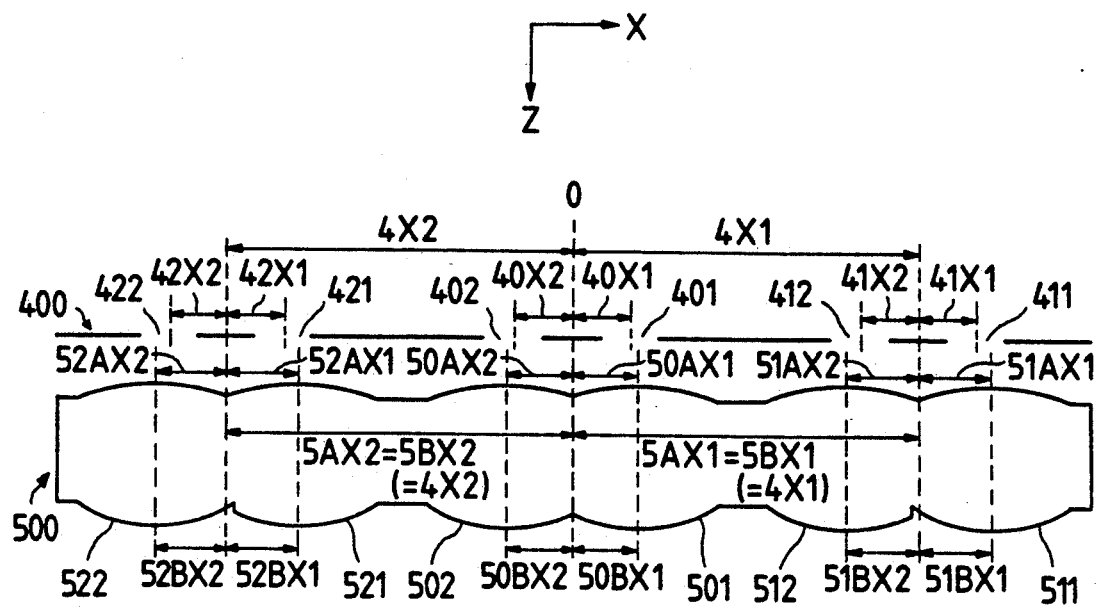
FIG. 1 is an X-Z sectional view showing a positional relation between an aperture mask and a refocusing lens in a first embodiment.

FIG. 1 shows an X-Z sectional view to illustrate a positional relation between the aperture mask 400 and the refocusing lens 500 of the first embodiment.

Data of the elements shown in the drawing are given below.

> 4X1 = 5AX1 = 5BX1, 4X2 = 5AX2 = 5BX2,
> 40X1 = 40X2 = 41X1 = 41X2 = 42X1 = 42X2,
> 50AX1 = 50AX2 < 51AX1 = 51AX2 = 52AX1 = 52AX2,
> 50BX1 = 50BX2 < 51BX1 = 51BX2 = 52BX1 = 52BX2,
> 50AX1 = 50AX2 = 50BX1 = 50BX2,
> 51AX1 = 51AX2 = 51BX1 = 51BX2,
> 52AX1 = 52AX2 = 52BX1 = 52BX2

In the first embodiment, the positional relation between the centers of the pairs of apertures and 412 (421 and 422) of the focusing detection systems on the left and right of the photographing field, and the optical axes of the corresponding pairs of refocusing lenses 511 and 512 (521 and 522) is different from the positional relation between the pair of apertures 401 and 402 of the on-axis focusing detection optical system and the corresponding pair of refocusing lenses 501 and 502, and the optical axes of the pairs of refocusing lenses 511 and 512 (521 and 522) of the off-axis focusing detection optical system are symmetrically arranged with respect to the symmetry axis of the corresponding pair of apertures 411 and 412 (421 and 422).

The symmetry axis of the pair of apertures 411 and 412 is parallel to the Z-axis and passes through a point spaced leftward in the X direction from the optical axis 0 by a distance 4X1 on the plane of the aperture 400. Similarly, the symmetry axis of the pair of apertures 421 and 422 is parallel to the Z-axis and passes through a point spaced rightward in the X direction by a distance 4X2 from the optical axis 0 on the plane of the aperture 400.

Figure 14:
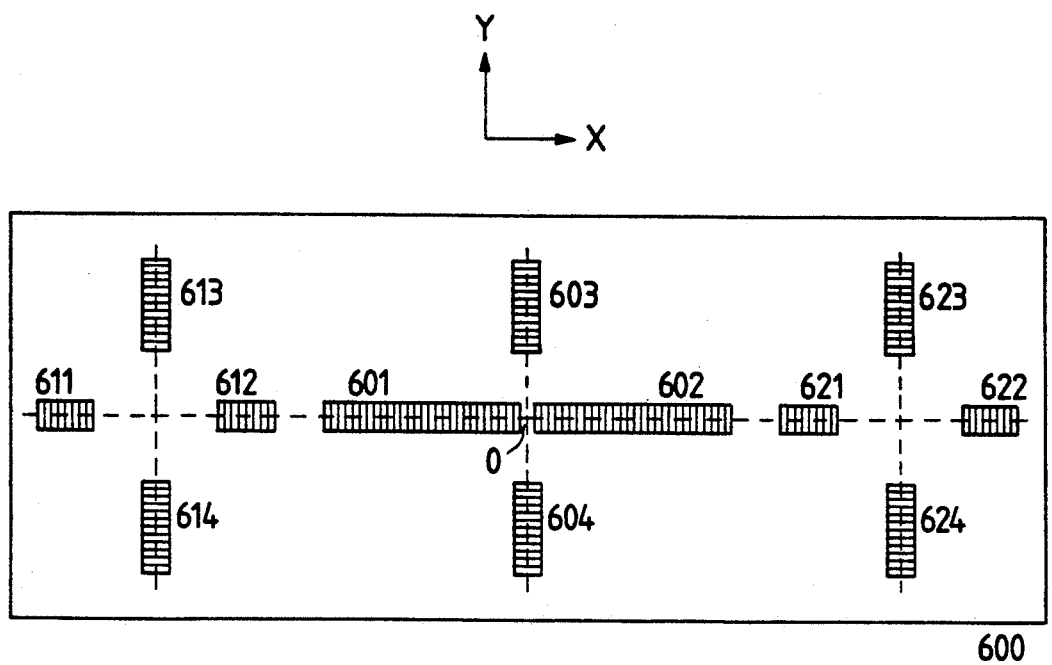
FIG. 14 shows an arrangement of a photo-electric converter array on the photo-electric converter in the first embodiment.

FIG. 14 shows an arrangement of the photo-electric converter array on the photo-electric converter 600 of the first embodiment.

In FIG. 14, numerals 601 and 602 denote photo-electric conversion arrays corresponding to the area 20X in the major side direction (X direction) of the field in the on-axis focusing detection area. The sense the focusing detection light beam from the area 20X by the X direction on-axis focusing detection optical system. Numerals 603 and 604 denote photo-electric converter arrays corresponding to the area 20Y in the minor side direction (Y direction) of the field in the on-axis focusing detection area. They sense the focusing detection light beam from the area 20Y by the Y-axis on-axis focusing detection optical system.

Numerals 611 and 612 denote photo-electric converter arrays corresponding to the area 21X in the major side direction (X direction) of the field in the off-axis focusing detection area on the left of the field. They sense the focusing detection light beam from the area 21X by the left X-axis off-axis focusing detection optical system. Numerals 613 and 614 denote photoconverter arrays corresponding to the area 21Y in the minor side direction (Y direction) of the field in the off-axis focusing detection area on the left of the field. They sense the focusing detection light beam from the area 21Y by the left Y-axis off-axis focusing detection optical system.

Further, numerals 621 and 622 denote photo-conductor arrays corresponding to the area 22X in the major side direction (X direction) of the field in the off-axis focusing detection area on the right of the field. They sense the focusing detection light beam from the area 22X by the right X-axis off-axis focusing detection optical system. Numerals 613 and 614 denote photo-conductor arrays corresponding the area 22Y in the minor side direction (Y direction) of the field in the off-axis focusing detection area on the right of the field. They sense the focusing detection light beam from the area 22Y by the right Y-axis off-axis focusing detection optical system.

Figure 15:
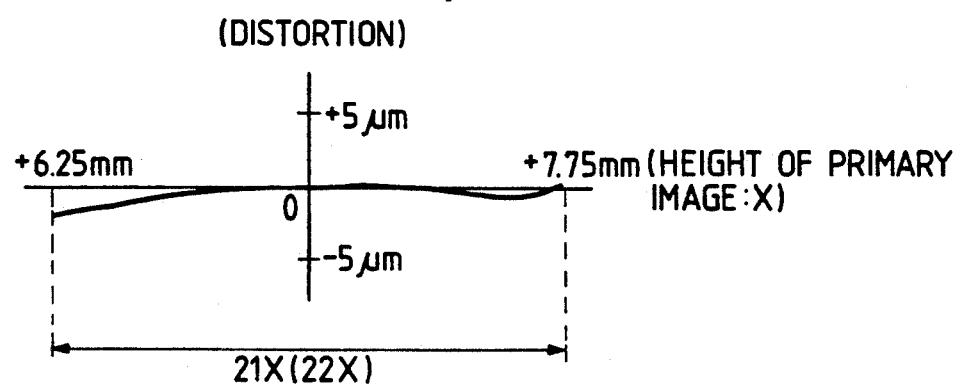
FIG. 15 shows a distortion difference in the first embodiment.

FIG. 15 shows a distortion difference in the first embodiment.

A distortion difference in the area 21X (22X) in the major side direction (X direction) of the photographing field in the off-axis focusing detection area, which is converted on the focal plane of the photographing lens 100, is shown in a real scale. As seen from FIG. 15, the distortion difference is well corrected.

As described above, the positional relation between the centers of the pairs of apertures 411 and 412 (421 and 422) of the off-axis focusing detection optical systems on the left and right of the photographing field, and the optical axes of the corresponding pairs of refocusing lenses 511 and 512 (521 and 522) is different from the positional relation between the pair of apertures 401 and 402 of the on-axis focusing detection optical system and the corresponding pair of refocusing lenses 501 and 502, and the optical axes of the pairs of refocusing lenses 511 and 512 (521 and 522) of the off-axis focusing detection optical systems are symmetrically arranged with respect to the symmetry axis of the corresponding pairs of apertures 411 and 412 (421 and 422). In this manner, the distortion difference in the off-axis focusing detection system is corrected to maintain a high precision in the focusing detection.

SECOND EMBODIMENT

Figure 16:
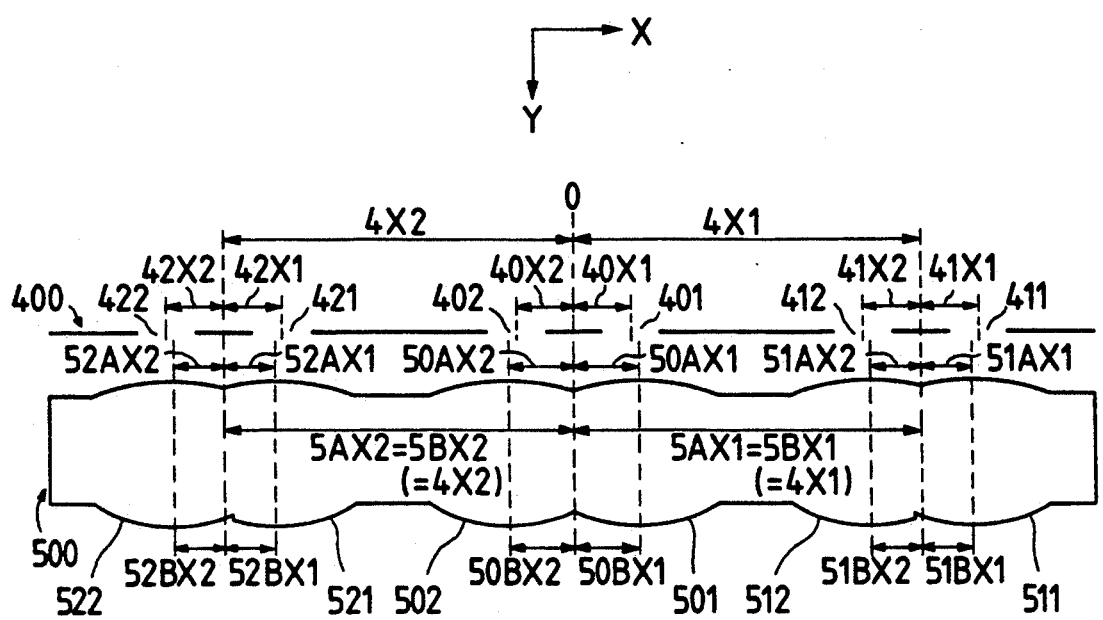
FIG. 16 is an X-Z sectional view showing a positional relation between an aperture mask and a refocusing lens in a second embodiment.

FIG. 16 shows an X-Z sectional view illustrating a positional relation between the aperture mask 400 and the refocusing lens 500 in the second embodiment. The other construction of the focusing detection system than that shown in FIG. 16 is identical to that of the first embodiment, and the explanation thereof is omitted.

Data of the elements is shown below.

```
4X1=5AX1=5BX1, 4X2=5AX2=5BX2,
40X1=40X2=41X1=41X2=42X1=42X2,
50AX1=50AX2>51AX1=51AX2=52AX1=52AX2,
50BX1=50BX2>51BX1=51BX2=52BX1=52BX2,
50AX1=50AX2=50BX1=50BX2,
51AX1=51AX2=51BX1=51BX2,
52AX1=52AX2=52BX1=52BX2,
```

In the second embodiment, the positional relation between the centers of the pairs of apertures 411 and 412 (421 and 422) of the off-axis focusing detection optical systems on the left and right of the photographing field, and the optical axes of the corresponding pairs of refocusing lenses 1 and 512 (521 and 522) is different from the positional relation between the pair of apertures 1 and 402 of the on-axis focusing detection optical system and the corresponding pair of refocusing lenses 1 and 502, and the optical axes of the pairs of refocusing lenses 511 and 512 (521 and 522) of the off-axis focusing detection optical system are symmetrically arranged with respect to the symmetry axis of the corresponding pairs of apertures 411 and 412 (421 and 422).

Figure 17:
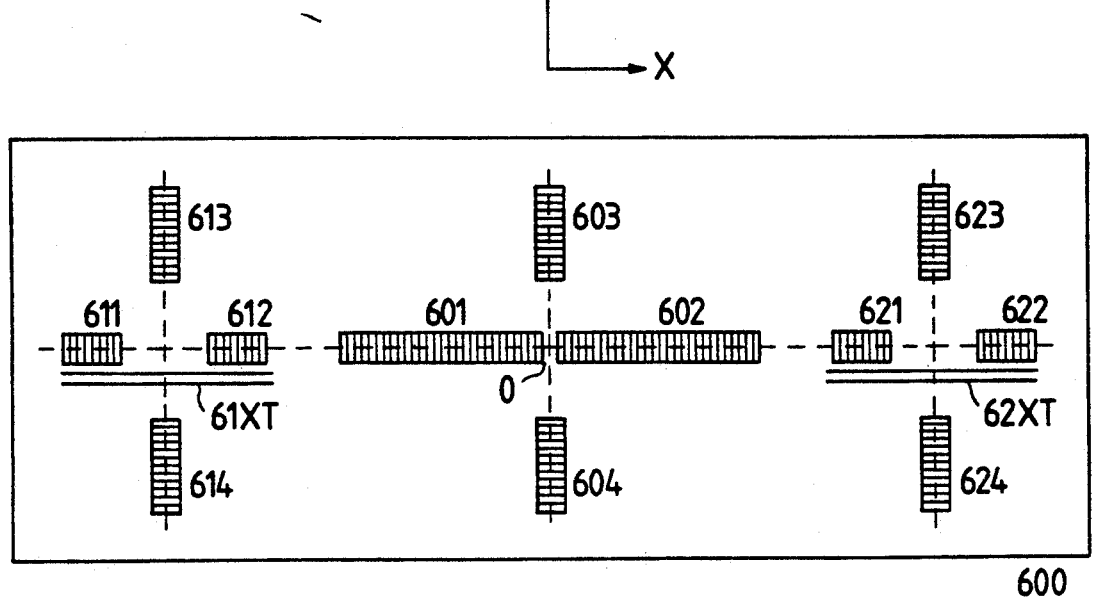
FIG. 17 shows an arrangement of a photo-electric converter array on a photo-electric converter in the second embodiment.

FIG. 17 shows an arrangement of the photo-converter arrays on the photo-electric converter 600 in the second embodiment. The relation between the photo-electric converter arrays, and the focusing detection areas and the focusing detection optical systems is similar to that shown in FIG. 14 and the explanation thereof is omitted.

As seen from FIG. 17, the spacings between the photo-converter arrays (611 and 612, 621 and 622) corresponding to the areas 21X and 22X in the major side direction (X axis) of the field in the off-axis focusing detection area are narrow so that the charge transfer paths 61XT and 62XT can be shortened.

Further, the spacings between the photo-electric converter arrays corresponding to the off-axis focusing detection area and the photo-electric converter arrays corresponding to the on-axis focusing detection area (612 and 601, 602 and 21) are wide so that the affect by the stray light is reduced.

THIRD EMBODIMENT

Figure 2:
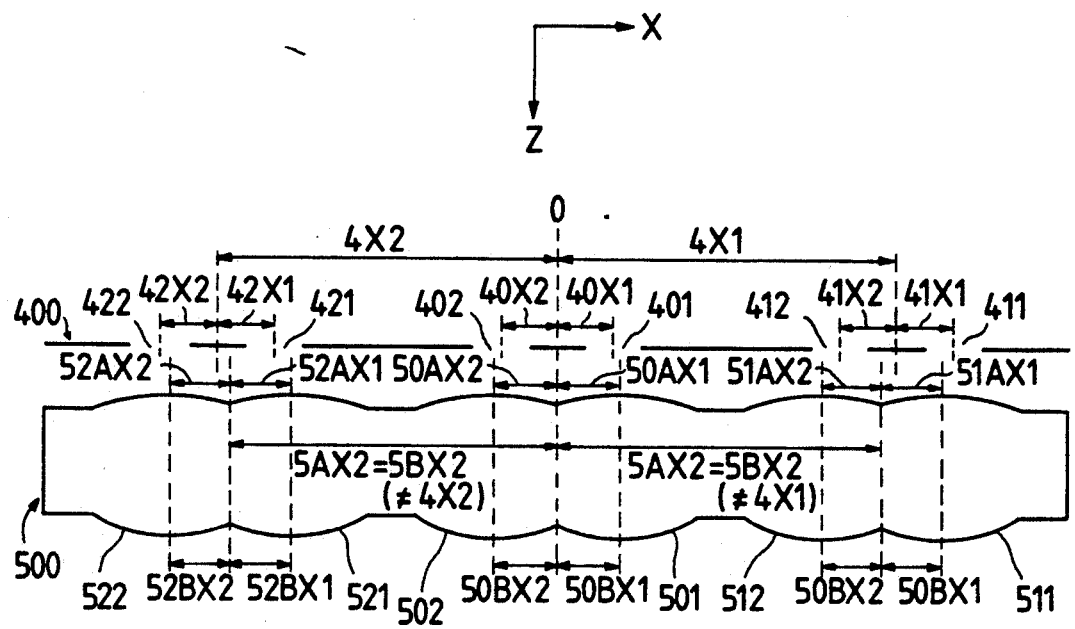
FIG. 2 is an X-Z sectional view showing a positional relation between an aperture mask and a refocusing lens in a third embodiment.

FIG. 2 shows an X-Z sectional view illustrating the positional relation between the aperture mask 400 and the refocusing lens 500 in the third embodiment. The other construction of the focusing detection optical system than that shown in FIG. 2 is identical to that of the first embodiment, and the explanation thereof is omitted.

Data of the elements is shown below.

```
4X1>5AX1=5BX1, 4X2>5AX2=5BX2,
40X1=40X2=41X1=41X2=42X1=42X2,
50AX1=50AX2>51AX1=51AX2=52AX1=52AX2,
50BX1=50BX2>51BX1=51BX2=52BX1=52BX2,
50AX1=50AX2=50BX1=50BX2,
51AX1=51AX2=51BX1=51BX2,
52AX1=52AX2=52BX1=52BX2
```

In the third embodiment, the positional relation between the centers of the pairs of apertures 411 and 412 (421 and 422) of the off-axis focusing detection optical system on the left and right of the photographing field, and the optical axes of the corresponding pairs of refocusing lenses 511 and 512 (521 and 522) is different from the positional relation between the pair of apertures 401 and 402 of the on-axis focusing detection optical system and the corresponding pair of refocusing lenses 501 and 502, and the optical axes of the pairs of refocusing lenses 511 and 512 (521 and 522) of the off-axis focusing detection optical system are asymmetrically arranged with respect to the symmetry axes of the corresponding pairs of apertures 411 and 412 (421 and 422).

Figure 18:
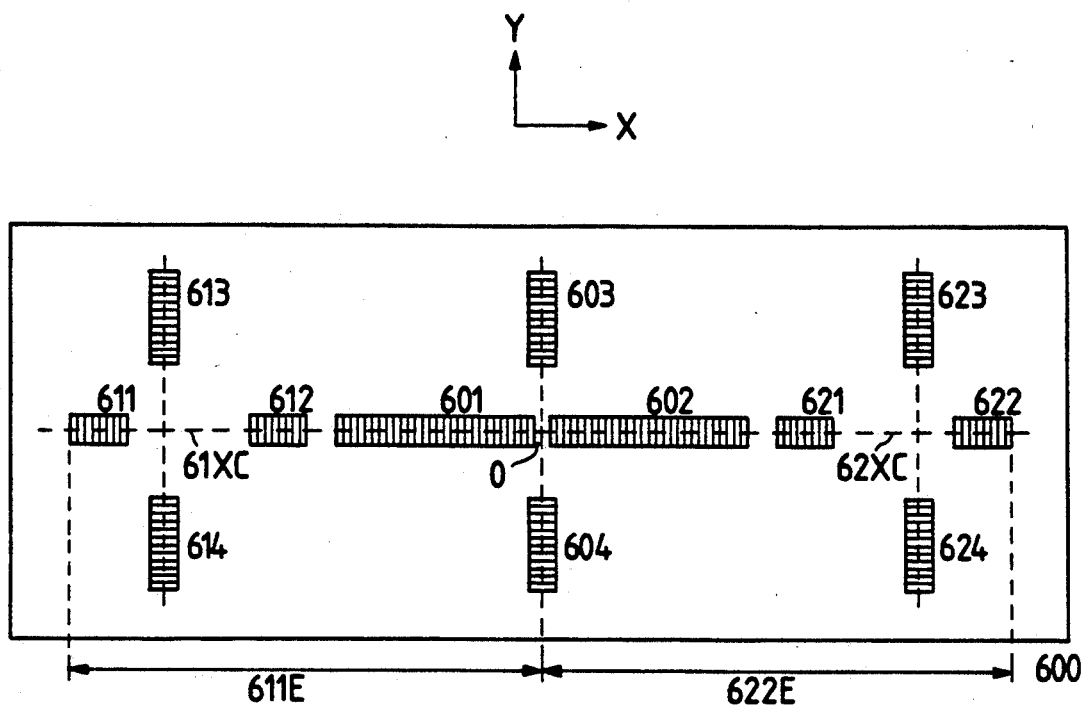
FIG. 18 shows an arrangement of a photo-electric converter array on a photo-electric converter in the third embodiment.

FIG. 18 shows an arrangement of the photo-electric converter arrays on the photo-electric converter 600 in the third embodiment. The relation between the photo-electric converter arrays, and the focusing detection areas and the focusing detection optical system is similar to that shown in FIG. 14 and the explanation thereof is omitted.

The centers 61XC and 62XC of the photo-electric converter arrays 611, 612, 621 and 622 corresponding to the off-axis focusing detection areas 21X and 22X in the major side direction (X direction) of the field are closer to the optical axis 0 than the centers of the photo-electric converter arrays 613, 614, 623 and 624 in the minor side direction (Y direction) so that the distances 611E and 622E to the far ends of the converter arrays are shortened and the size of the photo-electric converter 600 is reduced.

FOURTH EMBODIMENT

Figure 3:
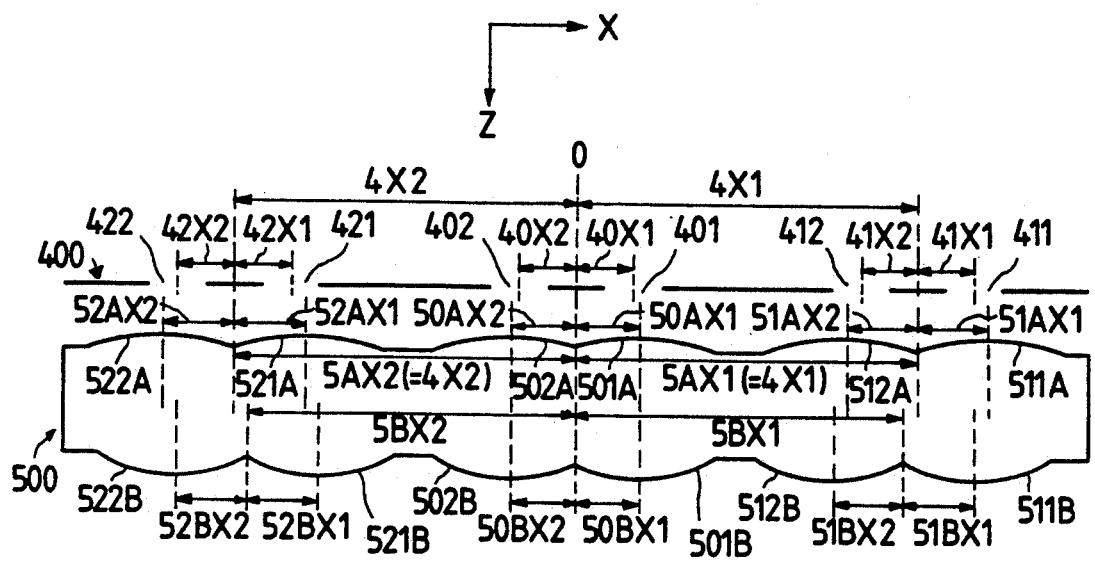
FIG. 3 is an X-Z sectional view showing a positional relation between an aperture mask and a refocusing lens in a fourth embodiment.

FIG. 3 shows an X-Z sectional view illustrating the positional relation between the aperture mask 400 and the refocusing lens 500 in the fourth embodiment. The other construction than that shown in FIG. 3 is identical to that of the first embodiment, and the explanation thereof is omitted.

Data of the elements is shown below.

$4X1 = 5AX1 > 5BX1, 4X2 = 5AX2 > 5BX2,$
$40X1 = 40X2 = 41X1 = 41X2 = 42X1 = 42X2,$
$50AX1 = 50AX2 < 51AX1 = 51AX2 = 52AX1 = 52AX2,$
$50BX1 = 50BX2 < 51BX1 = 51BX2 = 52BX1 = 52BX2,$
$50AX1 = 50AX2 = 50BX1 = 50BX2,$
$51AX1 = 51AX2 = 51BX1 = 51BX2,$
$52AX1 = 52AX2 = 52BX1 = 52BX2$

In the fourth embodiment, the positional relation between the centers of the pairs of apertures 411 and 412 (421 and 422) of the off-axis focusing detection optical system on the left and right of the photographing field, and the optical axes of the corresponding pairs of refocusing lenses 511 and 512 (521 and 522) is different from the positional relation between the pair of apertures 401 and 402 of the on-axis focusing detection optical system and the corresponding pair of refocusing lenses 501 and 502, and the symmetry axis of the lens spherical planes 511A and 512A (521A and 522A) of the pair of refocusing lenses of the off-axis focusing detection optical system which face the apertures is eccentric to the symmetry axis of the lens spherical planes 511B and 512B (521B and 522B) behind the lens spherical planes 511A and 512A (521A and 522A).

Figure 19:
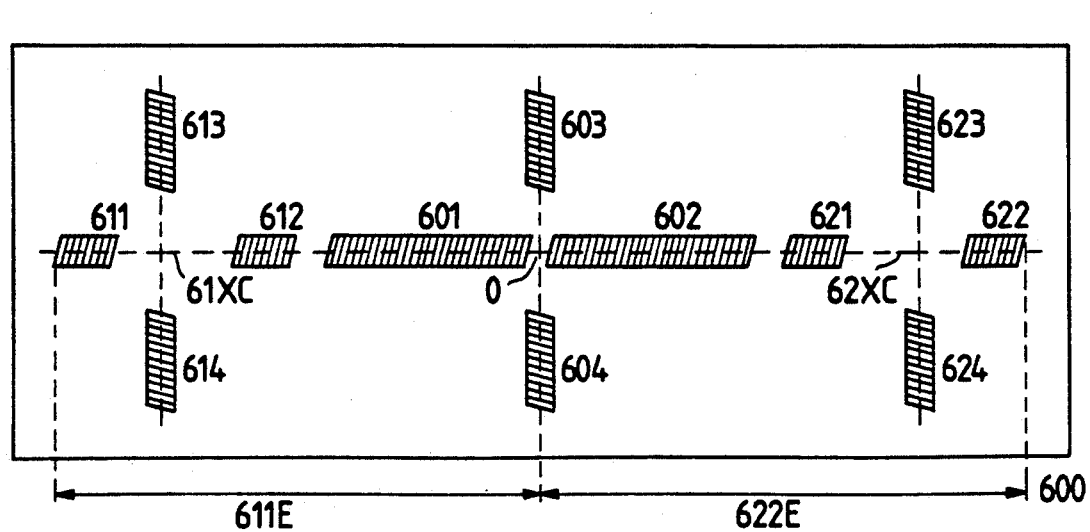
FIG. 19 shows an arrangement of a photo-electric converter array on a photo-electric converter in the fourth embodiment.

FIG. 19 shows an arrangement of the photo-electric converter arrays on the photo-electric converter 600 in the fourth embodiment. The relations between the photo-electric converter arrays, and the focusing detection areas and the focusing detection optical systems are similar to those shown in FIG. 14 and the explanation thereof is omitted. In the present embodiment, the pixels of the photo-electric converters are obliquely arranged as shown.

The centers 61XC and 62XC of the photo-electric converter arrays 611, 612, 621 and 622 corresponding to the off-axis focusing detection areas 21X and 22X in the major side direction (X direction) of the field are arranged closer to the optical axis 0 than the centers of the photo-electric converter arrays 613, 614, 623 and 624 in the minor side direction (Y direction) so that the distances 611E and 622E to the far ends of the converter arrays are shortened and the size of the photo-electric converter 600 is reduced.

In the above embodiments, the positional relation between the pair of apertures and the pair of refocusing lenses in the focusing detection optical system corresponding to the off-axis focusing detection areas in the major side direction (X direction) of the photographing field has been explained. The arrangement of the off-axis focusing detection areas is not limited to those shown in the above embodiments but it may also applicable to the focusing detection optical system corresponding to the off-axis focusing detection areas arranged radially from the optical axis. It may be further applicable to the focusing detection system corresponding to the off-axis focusing detection areas which are set at other points than those radially from the optical axis.

In the above embodiments, the apertures 401 and 402 and the refocusing lenses 501 and 502 constitute the pair of apertures of the focusing detection optical system corresponding to the on-axis focusing detection area and the corresponding pair of refocusing lenses, the apertures 411 and 412 (421 and 422) and the refocusing lenses 511 and 512 (521 and 522) constitute the pair of apertures of the focusing detection optical system corresponding to the off-axis focusing detection area and the corresponding refocusing lenses, the lens spherical planes 511A and 512A (521A and 522A) constitute the lens spherical planes of the pair of refocusing lenses, facing the apertures, of the focusing detection optical system corresponding to the off-axis focusing detection area, and the lens spherical planes 511B and 512B (521B and 522B) constitute the lens spherical planes behind thereof.

In accordance with the present invention, the positional relation between the centers of the pair of apertures of the off-axis focusing detection optical system and the optical axes of the pair of refocusing lenses is different from the positional relation between those of the on-axis focusing detection optical system. The optical axes of the pair of refocusing lenses of the off-axis focusing detection optical system are symmetrically or asymmetrically arranged with respect to the symmetry axis of the pair of apertures, or the symmetry axis of the lens spherical planes of the pair of refocusing lens of the off-axis focusing detection optical system which face the apertures is eccentrically arranged to the symmetry axis of the lens spherical planes behind thereof. In this manner, the aberration remaining in the pair of light beams used for the focusing detection of the off-axis area can be well corrected and the performance of the focusing detection is improved. Further, the interference between the photo-electric converter arrays is avoided and the charge transfer path is shortened and the size of the photo-electric converter is reduced.

What is claimed is:

1. A focusing detection apparatus having at least a focusing detection area on an optical axis of a photographing lens and a focusing detection area off the optical axis of the photographing lens in a photo-graphing field and having a focusing detection optical system including at least a pair of apertures and a pair of refocusing lenses provided one set for each of said focusing detection areas, wherein said focusing detection optical systems are arranged such that a positional relation between centers of the pair of apertures in the off-axis focusing detection optical system and optical axes of the pair of refocusing lenses corresponding to the apertures is different from that of the on-axis focusing detection optical system.

2. A focusing detection apparatus according to claim 1 wherein the optical axes of the pair of refocusing lenses in the off-axis focusing detection optical system are symmetrically arranged with respect to a symmetry axis of the pair of apertures.

3. A focusing detection apparatus according to claim 1 wherein the optical axes of the pair of refocusing lenses in the off-axis focusing detection optical system are asymmetrically arranged with respect to a symmetry axis of the pair of apertures.

4. A focusing detection apparatus according to claim 1 a symmetry axis of lens spherical planes of the pair of refocusing lens, facing the pair of apertures, in the off-axis focusing detection optical system is eccentric to a symmetry axes of the lens spherical planes behind said lens spherical planes.

5. A focusing detection apparatus having at least two orthogonal focusing detection areas on an optical axis of a photographing lens and two orthogonal focusing detection areas off the optical axis of the photographing lens in a photographing field and having a focus detection optical system including at least a pair of apertures and a pair of refocusing lenses provided one set for each of said focusing detection areas, wherein said focusing detection optical systems are arranged such that a positional relation between centers of the two pairs of apertures of the focusing detection optical system corresponding to the off-axis focusing detection area and optical axes of the two pairs of refocusing lenses is not identical to that of the focusing detection optical system corresponding to the on-axis focusing detection area.

6. A focusing detection apparatus according to claim 5 wherein the optical axes of the two pairs of refocusing lenses of the focusing detection optical system corresponding to the two off-axis focusing detection areas are symmetrically arranged with respect to symmetry axes of the corresponding pairs of apertures.

7. A focusing detection apparatus according to claim 5 wherein the optical axes of the pair of refocusing lenses of at least one of the focusing detection optical systems corresponding to the two off-axis focusing detection areas are asymmetrically arranged with respect to symmetry axes of the corresponding pairs of apertures.

8. A focusing detection apparatus according to claim 5 a symmetry axis of lens spherical planes of the pair of refocusing lens, facing the pair of apertures, of at least one of the focusing detection optical systems corresponding to the two off-axis focusing detection areas is eccentric to a symmetry axes of the lens spherical planes behind said lens spherical planes.

* * * * *